United States Patent
Chapman et al.

(10) Patent No.: US 7,630,361 B2
(45) Date of Patent: Dec. 8, 2009

(54) METHOD AND APPARATUS FOR USING DATA-OVER-CABLE APPLICATIONS AND SERVICES IN NON-CABLE ENVIRONMENTS

(75) Inventors: John T. Chapman, Saratoga, CA (US); Andrew John Page, Campbell, CA (US); Gregory A. Taylor, Woodside, CA (US)

(73) Assignee: Cisco Technology, Inc., San Jose, CA (US)

( * ) Notice: Subject to any disclaimer, the term of this patent is extended or adjusted under 35 U.S.C. 154(b) by 607 days.

(21) Appl. No.: 11/385,129

(22) Filed: Mar. 20, 2006

(65) Prior Publication Data
US 2006/0271988 A1    Nov. 30, 2006

Related U.S. Application Data

(63) Continuation-in-part of application No. 11/134,818, filed on May 20, 2005.

(51) Int. Cl.
*H04L 12/66* (2006.01)

(52) U.S. Cl. .................. 370/352; 370/401; 370/467

(58) Field of Classification Search ............. 370/230, 370/235, 252–256, 401, 402–405, 422, 465, 370/466, 467, 469, 352–356
See application file for complete search history.

(56) References Cited

U.S. PATENT DOCUMENTS

| | | | |
|---|---|---|---|
| 4,977,593 | A | 12/1990 | Ballance |
| 5,153,763 | A | 10/1992 | Pidgeon |
| 5,457,678 | A | 10/1995 | Goeldner |
| 5,604,735 | A | 2/1997 | Levinson et al. |
| 5,724,510 | A | 3/1998 | Arndt et al. |
| 5,784,597 | A | 7/1998 | Chiu et al. |
| 5,805,602 | A | 9/1998 | Cloutier et al. |
| 5,918,019 | A | 6/1999 | Valencia |
| 5,931,954 | A | 8/1999 | Hoshina et al. |
| 5,933,420 | A | 8/1999 | Jaszewski et al. |
| 5,963,557 | A | 10/1999 | Eng |

(Continued)

FOREIGN PATENT DOCUMENTS

WO    00/72509    11/2000

(Continued)

OTHER PUBLICATIONS

Data Over Cable Service Interface Specification, Aug. 4, 1997.

(Continued)

*Primary Examiner*—Ricky Ngo
*Assistant Examiner*—Wei-Po Kao
(74) *Attorney, Agent, or Firm*—Stolowitz Ford Cowger LLP (57) ABSTRACT

A generic data over cable system configures different cable and/or non-cable network infrastructures to operate in a data over cable environment. In one embodiment, a Modular Cable Modem Termination System (M-CMTS) core is coupled to one or more physical gateways over a packet switched network. The physical gateways are connected to endpoints over either a cable or non-cable network infrastructure. An adaptation layer configures the physical gateways and the associated endpoints so that cable applications and cable subscriber services can operate over either the cable or non-cable network infrastructures.

18 Claims, 8 Drawing Sheets

U.S. PATENT DOCUMENTS

| | | | |
|---|---|---|---|
| 6,023,769 A | 2/2000 | Gonzalez | |
| 6,078,595 A | 6/2000 | Jones et al. | |
| 6,101,180 A | 8/2000 | Donahue et al. | |
| 6,137,793 A | 10/2000 | Gorman et al. | |
| 6,233,235 B1* | 5/2001 | Burke et al. | 370/356 |
| 6,233,246 B1 | 5/2001 | Hareski et al. | |
| 6,275,990 B1 | 8/2001 | Dapper et al. | |
| 6,381,214 B1 | 4/2002 | Prasad | |
| 6,418,324 B1 | 7/2002 | Doviak et al. | |
| 6,434,141 B1 | 8/2002 | Oz et al. | |
| 6,438,123 B1 | 8/2002 | Chapman | |
| 6,490,727 B1 | 12/2002 | Nazarathy et al. | |
| 6,510,162 B1 | 1/2003 | Fijolek et al. | |
| 6,516,345 B1 | 2/2003 | Kracht | |
| 6,546,017 B1 | 4/2003 | Khaunte | |
| 6,556,591 B2 | 4/2003 | Bernath et al. | |
| 6,640,248 B1 | 10/2003 | Jorgensen | |
| 6,693,878 B1 | 2/2004 | Daruwalla et al. | |
| 6,697,970 B1 | 2/2004 | Chisolm | |
| 6,698,022 B1 | 2/2004 | Wu | |
| 6,763,019 B2 | 7/2004 | Mehta et al. | |
| 6,763,032 B1 | 7/2004 | Rabenko et al. | |
| 6,771,606 B1 | 8/2004 | Kuan | |
| 6,804,251 B1 | 10/2004 | Limb et al. | |
| 6,819,682 B1 | 11/2004 | Rabenko et al. | |
| 6,847,635 B1 | 1/2005 | Beser | |
| 6,853,680 B1 | 2/2005 | Nikolich | |
| 6,857,132 B1 | 2/2005 | Rakib et al. | |
| 6,901,079 B1 | 5/2005 | Phadnis et al. | |
| 6,950,399 B1 | 9/2005 | Bushmitch et al. | |
| 6,959,042 B1 | 10/2005 | Liu et al. | |
| 6,993,016 B1 | 1/2006 | Liva et al. | |
| 6,993,353 B2 | 1/2006 | Desai et al. | |
| 6,996,129 B2 | 2/2006 | Krause et al. | |
| 7,006,500 B1 | 2/2006 | Pedersen et al. | |
| 7,007,296 B2 | 2/2006 | Rakib | |
| 7,023,882 B2 | 4/2006 | Woodward, Jr. et al. | |
| 7,039,049 B1* | 5/2006 | Akgun et al. | 370/389 |
| 7,065,779 B1 | 6/2006 | Crocker et al. | |
| 7,067,734 B2 | 6/2006 | Abe et al. | |
| 7,110,398 B2* | 9/2006 | Grand et al. | 370/389 |
| 7,113,484 B1 | 9/2006 | Chapman et al. | |
| 7,116,643 B2 | 10/2006 | Huang et al. | |
| 7,117,526 B1 | 10/2006 | Short | |
| 7,139,923 B1 | 11/2006 | Chapman et al. | |
| 7,145,887 B1 | 12/2006 | Akgun | |
| 7,149,223 B2 | 12/2006 | Liva et al. | |
| 7,161,945 B1 | 1/2007 | Cummings | |
| 7,164,690 B2 | 1/2007 | Limb et al. | |
| 7,197,052 B1 | 3/2007 | Crocker | |
| 7,206,321 B1 | 4/2007 | Bansal et al. | |
| 7,209,442 B1 | 4/2007 | Chapman | |
| 7,269,159 B1 | 9/2007 | Lai | |
| 7,290,046 B1* | 10/2007 | Kumar | 709/223 |
| 7,305,460 B2 | 12/2007 | Park | |
| 7,359,332 B2 | 4/2008 | Kolze et al. | |
| 7,363,629 B2 | 4/2008 | Springer et al. | |
| 2001/0010096 A1 | 7/2001 | Horton et al. | |
| 2001/0055319 A1 | 12/2001 | Quigley et al. | |
| 2001/0055469 A1 | 12/2001 | Shida et al. | |
| 2002/0009974 A1 | 1/2002 | Kuwahara et al. | |
| 2002/0010750 A1 | 1/2002 | Baretzki | |
| 2002/0023174 A1 | 2/2002 | Garret et al. | |
| 2002/0052927 A1 | 5/2002 | Park | |
| 2002/0067721 A1 | 6/2002 | Kye | |
| 2002/0073432 A1 | 6/2002 | Kolze | |
| 2002/0073433 A1 | 6/2002 | Furuta et al. | |
| 2002/0088003 A1 | 7/2002 | Salee | |
| 2002/0093935 A1 | 7/2002 | Denney et al. | |
| 2002/0093955 A1 | 7/2002 | Grand et al. | |
| 2002/0131403 A1 | 9/2002 | Desai et al. | |
| 2002/0131426 A1 | 9/2002 | Amit et al. | |
| 2002/0133618 A1 | 9/2002 | Desai et al. | |
| 2002/0136203 A1 | 9/2002 | Liva et al. | |
| 2002/0141585 A1 | 10/2002 | Carr | |
| 2002/0144284 A1 | 10/2002 | Burroughs et al. | |
| 2002/0146010 A1 | 10/2002 | Shenoi et al. | |
| 2002/0147978 A1 | 10/2002 | Dolgonos et al. | |
| 2002/0154655 A1 | 10/2002 | Gummalla et al. | |
| 2002/0161924 A1 | 10/2002 | Perrin et al. | |
| 2002/0198967 A1 | 12/2002 | Iwanojko et al. | |
| 2003/0014762 A1 | 1/2003 | Conover et al. | |
| 2003/0058794 A1 | 3/2003 | Pantelias et al. | |
| 2003/0061415 A1 | 3/2003 | Horton et al. | |
| 2003/0066087 A1 | 4/2003 | Sawyer et al. | |
| 2003/0067944 A1 | 4/2003 | Sala et al. | |
| 2003/0101463 A1 | 5/2003 | Greene et al. | |
| 2003/0140131 A1 | 7/2003 | Chandrashekhar et al. | |
| 2003/0163341 A1 | 8/2003 | Banerjee et al. | |
| 2003/0214943 A1 | 11/2003 | Engstrom et al. | |
| 2003/0214982 A1 | 11/2003 | Lorek et al. | |
| 2004/0039466 A1 | 2/2004 | Lilly et al. | |
| 2004/0045037 A1* | 3/2004 | Cummings et al. | 725/129 |
| 2004/0073902 A1 | 4/2004 | Kao et al. | |
| 2004/0101077 A1 | 5/2004 | Miller et al. | |
| 2004/0105403 A1 | 6/2004 | Lin et al. | |
| 2004/0105406 A1 | 6/2004 | Kayama et al. | |
| 2004/0143593 A1 | 7/2004 | Le Maut et al. | |
| 2004/0160945 A1* | 8/2004 | Dong et al. | 370/352 |
| 2004/0163129 A1 | 8/2004 | Chapman et al. | |
| 2004/0181800 A1 | 9/2004 | Rakib et al. | |
| 2004/0244043 A1 | 12/2004 | Lind et al. | |
| 2004/0248530 A1 | 12/2004 | Rakib et al. | |
| 2005/0018697 A1 | 1/2005 | Enns et al. | |
| 2005/0122976 A1 | 6/2005 | Poli et al. | |
| 2005/0138669 A1 | 6/2005 | Baran | |
| 2005/0198684 A1 | 9/2005 | Stone et al. | |
| 2005/0201399 A1 | 9/2005 | Woodward, Jr. et al. | |
| 2005/0226257 A1 | 10/2005 | Mirzabegian et al. | |
| 2005/0232294 A1 | 10/2005 | Quigley et al. | |
| 2005/0259645 A1 | 11/2005 | Chen et al. | |
| 2005/0265261 A1 | 12/2005 | Droms et al. | |
| 2005/0265309 A1 | 12/2005 | Parandekar | |
| 2005/0265338 A1 | 12/2005 | Chapman et al. | |
| 2005/0265376 A1 | 12/2005 | Chapman et al. | |
| 2005/0265392 A1 | 12/2005 | Chapman et al. | |
| 2005/0265394 A1 | 12/2005 | Chapman et al. | |
| 2005/0265397 A1 | 12/2005 | Chapman et al. | |
| 2005/0265398 A1 | 12/2005 | Chapman et al. | |
| 2005/0289623 A1 | 12/2005 | Midani et al. | |
| 2006/0002294 A1 | 1/2006 | Chapman et al. | |
| 2006/0126660 A1 | 6/2006 | Denney et al. | |
| 2006/0159100 A1 | 7/2006 | Droms et al. | |
| 2006/0168612 A1 | 7/2006 | Chapman et al. | |
| 2007/0274345 A1 | 11/2007 | Taylor et al. | |
| 2008/0037545 A1 | 2/2008 | Lansing et al. | |

FOREIGN PATENT DOCUMENTS

| | | |
|---|---|---|
| WO | 2005117310 | 12/2005 |
| WO | 2005117358 | 12/2005 |

OTHER PUBLICATIONS

Ethereal: Display Filter Reference: DOCSIS Upstream Channel Descriptor, Webarchivedate Apr. 27, 2004.

DOCSIS Set Top Gateway (DSG) interface specification, Feb. 28, 2002.

An Overview of Internet Protocols, Dann, Jan. 1998.

Patrick, M.; RFC3046-DHCP Rely Agent Information Option; The Internet Society (2001) http://www.faqs.org/rfcs/rfc3046.html; Jan. 2001; 11 pages.

Cable Television Laboratories, Inc., Interim Specification, Data-Over-Cable Service Interface Specifications, Radio Frequency Specification, SP-RFIv1.1-I02-990731, Jul. 30, 1999, 353 pages.

Cable Television Laboratories, Inc., Interim Specification, Data-Over-Cable Service Interface Specifications, Radio Frequency Interface Specification, SP-RFIv1.1-I04-000407, Apr. 7, 2000, 376 pages.
3COM, High-Speed Cable Internet Solutions, http://www.3com.com/cablenow/pdf/7125dsht.pdf, Dec. 1999, 4 pages.
Phuc H. Tran, USPTO Office Action Paper No. 20080427, May 1, 2008, 10 pages.
U.S. Appl. No. 11/292,725, Bernstein et al., "Advanced Multicast Support for Cable", filed Dec. 1, 2005.
Thompson, et al. IPv6 Stateless Address Autoconfiguration, RFC 2462, Dec. 1998, pp. 1-24, Network Working Group.
Thompson, et al. IPv6 Stateless Address Autoconfiguration, RFC 4862, Sep. 2007, pp. 1-29, Network Working Group.
Hawa et al., "Quality of Service Scheduling in Cable and Broadband Wireless Access Systems," at http://www.ittc.ku.edu/publications/documents/Hawa2002_iwqos_paper.pdf, downloaded on Sep. 29, 2008.
Postel, J., "User Datagram Protocol", RFC 768, Aug. 28, 1980, 3 pgs.
Postel, Jon, Editor, "DARPA Internet Program Protocol Specification", RFC 791, Sep. 1981, 45 pages.
Deering, S., "Host Extensions for IP Multicasting", RFC 1112, Aug. 1989.
Droms, R., "Dynamic Host Configuration Protocol", RFC 2131, Mar. 1997.
Townsley, W., et al., "Layer Two Tunneling Protocol "L2TP"", RFC 2661, Aug. 1999, 80 pages.
Cable Television Laboratories, Inc., "Data-Over-Cable Service Interface Specifications DOCSIS 2.0, Radio Frequency Specification", SP-RFIv2.0-I04-030730, 1999-2003, 512 pages.
Cable Television Laboratories, Inc., "Data-Over-Cable Service Interface Specifications DOCSIS 2.0, Radio Frequency Interface Specification", CM-SP-RFIv2.0-I08-050408, Annex C, pp. 339-390, Copyright 1999-2005.
Cable Television Laboratories, Inc., "Data-Over-Cable Service Interface Specifications DOCSIS 2.0, Radio Frequency Specification", CM-SP-RFIv2.0-I09-050812, 1999-2005, 534 pages.
Cable Television Laboratories, Inc., "DOCSIS® Set-top Gateway (DSG) Interface Specification" CM-SP-DSG-I02-040804, Copyright 2001-2004.
Cable Television Laboratories, Inc., "DOCSIS® Set-top Gateway (DSG) Interface Specification" CM-SP-DSG-I04-050408, Copyright 2001-2005.
Bhattacharyya, et al., "An Overview of Source-Specific Multicast (SSM)", RFC 3569, Jul. 2003.
Droms, R., et al., "Dynamic Host Configuration Protocol for IPv6 (DHCPv6)", RFC 3315, Jul. 2003.
Droms, R., "Stateless Dynamic Host Configuration Protocol (DHCP) Service for IPv6", RFC 3736, Apr. 2004.
Chapman, John T., "CMTS Remote PHY for a DOCSIS Network: DMPI Over IP Protocol Specification", RP-SP-DoIP-D1-040715B.doc, Cisco Systems, Inc., EDCS-387722, May 26, 2004.
Cisco Systems, Inc., DHCP and the DOCSIS Configuration File for Cable Modems (DOCSIS 1.0), Document ID: 10961, Sep. 16, 2004.
IEEE Standards, "802.16, IEEE Standard for Local and Metropolitan Area Networks, Part 16: Air Interface for Fixed Broadband Wireless Access Systems", IEEE Std. 802.16—2004, Oct. 1, 2004, 893 pages.
Cable Television Laboratories, Inc., "Data-Over-Cable Service Interface Specifications Modular CMTS", CM-SP-DEPI-W03-050302, 49 pgs., Copyright 2005.
Ramakrishnan, Sangeeta, "Next Generation Edge—Realizing the vision of shared resources and bandwidth", SCTE Conference on Emerging Technologies, Jan. 11-13, 2005, 16 pgs.
Chapman, John T., "Remote PHY Technical White Paper Addendum," Downstream External PHY Interface Specification, Cisco Systems, Inc., EDCS-377253, Jan. 24, 2005.
Cisco Systems, Inc., "Downstream External PHY Interface Specification", SP-DEPI-W2-041101A.DOC, EDCS-408926, Jan. 25, 2005.
Lau, J., et al., "Layer Two Tunneling Protocol—Version 3 (L2TPv3)," RFC 3931, Mar. 2005, 94 pages.
Cable Television Laboratories, Inc., "DOCSIS Radio Frequency Interface Specification", CM-SP-RFIv2.0-I10-051209, 538 pgs., Dec. 9, 2005.
Madvinsky, et al., Don't Let Your Modem Be Cloned, Jun. 2000, pp. 1-7, Communications Technology.
Millet, Theft of Service-Inevitable?, Dec. 2005, pp. 1-4, Communications Technology.
ETSI, Data-Over-Cable Systems Part 2 Radio Frequency Interface Specifications, Jan. 2003, pp. 59-66, ES 201 488-2 V1.2.1.
Desai, et al., FastChannel: A Higher-Speed Cable Data Service, AT&T Labs-Research, pp. 1-13, in SCTE 2002 conf.
Adoba, et al., Extensible Authentication Protocol (EAP), RFC 3748, Jun. 2004, pp. 1-64, Standards Track.
ITU-T Telecommunication Standardization Sector of ITU, Series J: Cable Networks And Transmission Of Television, Sound Programme And Other Multimedia Signals, Interactive Systems For Digital Television Distribution, Recommendation J.122, Dec. 2002, 506 pages, International Telecommunication Union.

* cited by examiner

MODEM INITIALIZATION

METHOD AND APPARATUS FOR USING DATA-OVER-CABLE APPLICATIONS AND SERVICES IN NON-CABLE ENVIRONMENTS

This application is a continuation in part of co-pending application Ser. No. 11/134,818, filed May 20, 2005, entitled "TIMING SYSTEM FOR MODULAR CABLE MODEM TERMINATION SYSTEM" which is herein incorporated by reference.

BACKGROUND

The Data Over Cable Services Interface Specification (DOCSIS) relates to the hardware and software used for transferring Internet Protocol (IP) data over a cable network between a distribution hub or headend and Customer Premises Equipment (CPE). This includes both the hardware and software used in Cable Modem Termination System (CMTS) at the headend and the hardware and software used in the cable modem or set-top box at the CPE.

The DOCSIS environment has several strengths, including the ability to manage point to multi-point links and supporting service provider provisioning where subscribers can be added and removed at scale. The DOCSIS protocol has overcome the difficult task of managing upstream bandwidth while also effectively supporting Quality of Service (QoS). DOCSIS also provides a full security infrastructure where packets can be encrypted, incoming data checked, and Internet Protocol (IP) addressing verified. Thus, DOCSIS provides a mature, time tested, reliable technology that has been operating successfully for many years.

Non-cable technologies include, but are not limited to, Fiber To The Home (FTTH), Ethernet To The Home (ETTH), Passive Optical Network (PON), Digital Subscriber Lines (DSL), xDSL, wireless, and satellite communication systems. Unfortunately, these non-cable technologies are not as thoroughly tested and do not provide all of the functionality currently supported by DOCSIS. For example, ETTH and FTTH do not currently support customer provisioning in a service provider type environment.

DOCSIS successfully manages the dynamic oversubscription environment, QoS, physical layer record management, IP layer protocols and provides many subscriber applications that are not currently available in non-cable technologies. Unfortunately, up to now, these non-cable network infrastructures have not been able to fully leverage the features of the more mature DOCSIS technology.

The present invention addresses this and other problems associated with the prior art.

SUMMARY OF THE INVENTION

A generic data over cable system configures different cable and/or non-cable network infrastructures to operate in a data over cable environment. In one embodiment, a Modular Cable Modem Termination System (M-CMTS) core is coupled to one or more physical gateways over a packet switched network. The physical gateways are connected to endpoints over either a cable or non-cable network infrastructure. An adaptation layer configures the physical gateways and the associated endpoints so that cable applications and cable subscriber services can operate over either the cable or non-cable network infrastructures.

The foregoing and other objects, features and advantages of the invention will become more readily apparent from the following detailed description of a preferred embodiment of the invention which proceeds with reference to the accompanying drawings.

DETAILED DESCRIPTION

Figure 1:
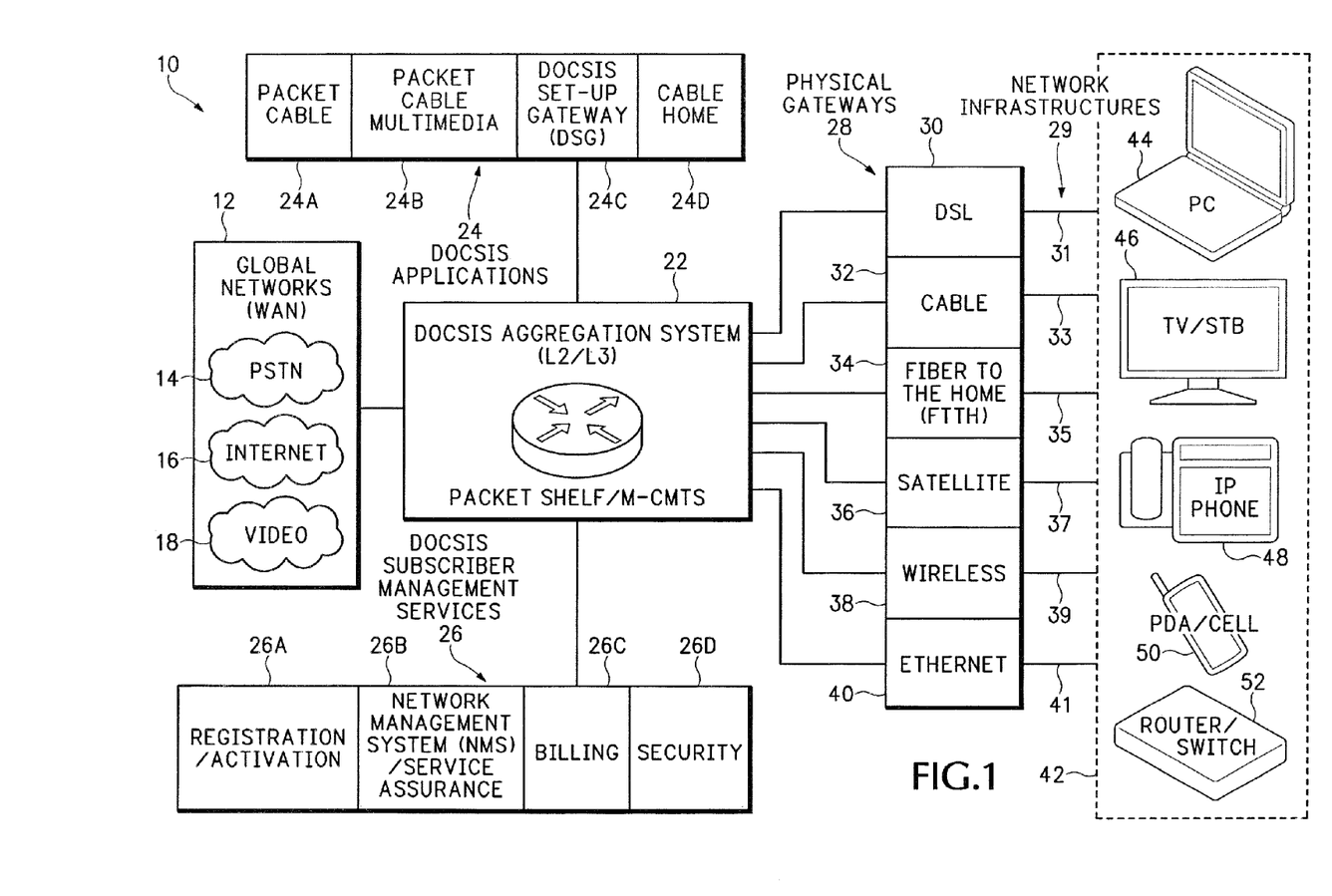
FIG. 1 is a block diagram of a generic DOCSIS architecture used with different cable and non-cable network infrastructures.

FIG. 1 shows a generic DOCSIS architecture 10 that allows the same DOCSIS applications and subscriber management services to be used with different physical "last mile" infrastructures 29. Different global networks 12 can include a Public Switched Telephone Network (PSTN), Internet packet switched network 16, and/or video network 18. Any combination of global networks 12 are alternatively referred to as a Wide Area Network (WAN) 12 and communicate with a DOCSIS aggregation system 22. The DOCSIS aggregation system 22 uses a DOCSIS protocol for transferring data between the WAN 12 and different endpoints 42. The DOCSIS aggregation system 22 operates both at layer-3 (L-3) and layer-2 (L-2) of the Open Systems Interconnect (OSI) model.

Contrary to conventional Cable Modem Termination System (CMTS) architectures, the generic DOCSIS architecture 10 includes physical gateways 28 that allow the DOCSIS aggregation system 22 to communicate with endpoints 42 through either a cable physical infrastructure 33 or through non-cable physical infrastructures 31, 35, 37, 39 and 41. The physical gateways 28 provide the layer-1 (L-1) physical for interfacing between the DOCSIS aggregation system 22 and the different "last mile" physical network infrastructures used for connecting to different subscriber endpoints 42.

For example, a Digital Subscriber Line (DSL) physical gateway 30 may connect to endpoints 42 through to a DSL network infrastructure 31 that transports IP traffic over telephone lines using DSL signaling. Another cable physical gateway 32 may connect to other endpoints 42 through a Hybrid Fiber Coax (HFC) plant infrastructure 33 that uses coaxial cable to transport IP traffic using DOCSIS signaling. In other examples, a Fiber To The Home (FTTH) physical gateway 34 may communicate with some endpoints 42 through a fiber cable network infrastructure 35 and a satellite physical gateway 36 may communicate with endpoints 42 through a satellite network infrastructure 37. Similarly, a wireless physical gateway 38 may communicated with endpoints 42 over a cellular and/or 802.16 network infrastructure 39 and an Ethernet physical gateway 40 may communicate with endpoints 42 using an Ethernet network infrastructure 41.

These network infrastructures 29 are often referred to as the "last mile" connectivity because they typically provide the physical connectivity into the home or office where the endpoints 42 are located. This "last mile" terminology however is a term of art and does not actually represent or restrict the length of the network infrastructures 29 that connect to the endpoints 42. For example, the length of the network infrastructures 29 may be substantially longer than one mile or may be substantially less than one mile, depending on the distance of the physical gateways 28 from the endpoints 42.

The endpoints 42 can be any device that may need to receive information from or transmit information to the WAN 12. Examples of endpoints 42 may include a Personal Computer (PC) 44, television and/or set-top box 46, IP phone 48, Personal Digital Assistant (PDA), cell phone or smart phone 50, router/switch 52, etc. Typically the endpoints 42 include modems adapted for coding and decoding the signaling used for a particular network infrastructure 29. The modems may be located inside the endpoint 42 or may be located in a separate device or chassis. However, it is possible that the same endpoint of Customer Premise Equipment (CPE) may have multiple modems for connecting to different network infrastructures 29.

Different DOCSIS applications 24 currently exist that operate in conjunction with the DOCSIS protocol. Examples of some of these DOCSIS applications include, but are not limited to, Packet Cable 24A, Packet Cable Multi-Media 24B, DOCSIS Set-top Gateway (DSG), and Cable Home 24D. These are simply examples of different DOCSIS applications that currently exist that provide DOCSIS subscriber services to endpoints 42. These applications, for example, provide the cable television and cable Internet functionality used by subscribers for communicating and controlling television and Internet services.

Other DOCSIS subscriber management services 26 are used by the service provider operating DOCSIS aggregation system 22 to manage the different subscriber endpoints 42. For example, the DOCSIS subscriber management services 26 may include, but are not limited to, registration/activation 26A, Network Management System (NMS)/service assurance 26B, billing 26C, and security 26D. These subscriber management services 26 also use the DOCSIS protocol for managing endpoints 42. The DOCSIS applications 24 and subscriber management services 26 are described in more detail at www.cablelabs.com, which are herein incorporated by reference.

Previously these DOCSIS applications 24 and DOCSIS subscriber management services 26 were only supported for cable systems. However, the generic DOCSIS architecture 10 allows these different preexisting or future developed DOCSIS applications 24 and/or DOCSIS subscriber management services 26 to be used with both cable and non-cable network infrastructures 29.

Modular-CMTS Architecture

Figure 2:
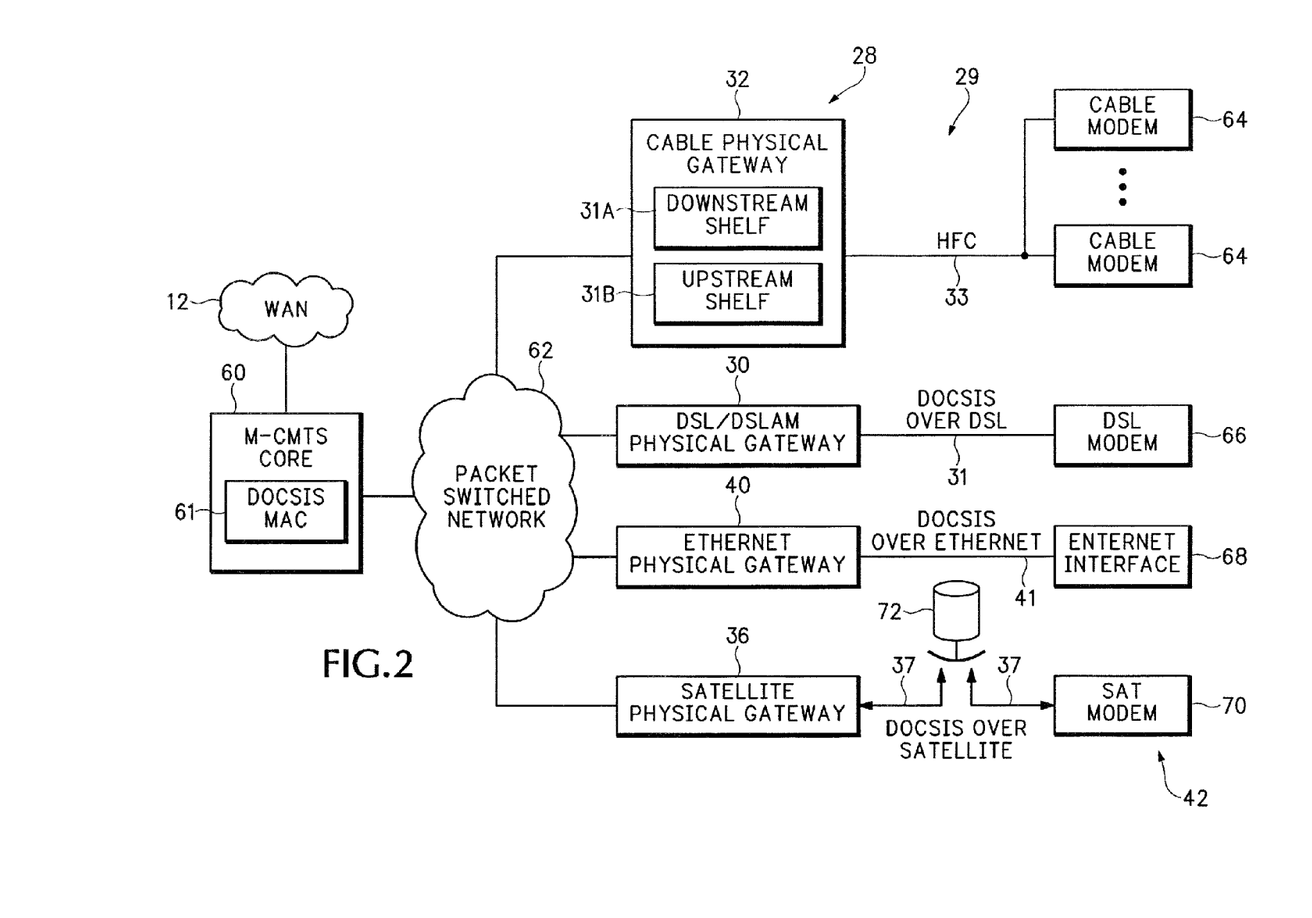
FIG. 2 is a block diagram showing how a Modular Cable Modem Termination System (M-CMTS) can be used with the generic DOCSIS architecture shown in FIG. 1.

FIG. 2 shows a new Modular Cable Modem Termination System (M-CMTS) architecture that is described in co-pending application Ser. No. 11/134,818, filed May 20, 2005, entitled "TIMING SYSTEM FOR MODULAR CABLE MODEM TERMINATION SYSTEM", which is herein incorporated by reference.

One characteristic of the M-CMTS architecture is that the DOCSIS Media Access Control (MAC) 61 and Physical Interface (PHY) 31 are located in different chassis and connected together through some type of packet switched network 62, such as Gigabit Ethernet (GE), 10GE, or Multi-Protocol Label Switching (MPLS). In one embodiment, the DOCSIS MAC 61 is located in an M-CMTS core 60 and upstream and downstream PHY shelves 31A and 31B, respectively, are located in an Edge Quadrature Amplitude Modulation (EQAM) cable physical gateway 32.

In one embodiment, the generic DOCSIS architecture uses the M-CMTS with the physically separated PHY-MAC functionality to support other non-cable broadband technologies such as Fiber To The Home (FTTH), Ethernet To The Home (ETTH), Passive Optical Network (PON), Point to Multi-Point (PtMP), satellite, wireless, and Digital Subscriber Line (DSL), just to name a few. In one example, as described in co-pending application Ser. No. 11/134,818, the DOCSIS MAC 61 is used for transferring IP data over a HFC plant 33 to multiple different cable modems 64. The cable gateway 32 may have different combinations of downstream PHY shelves 31A for sending the DOCSIS data over downstream channels to the cable modems 64 and upstream PHY shelves 31B for receiving DOCSIS data over upstream channels from the cable modems 64.

The DOCSIS MAC 61 is also configurable to communicate over the packet switch network 62 with a DSL/DSLAM physical gateway 30, Ethernet physical gateway 40, satellite physical gateway 36, or any of the other physical gateways and associated network infrastructure 31, 41, and 37, respectively. The hardware and software that operates the DOCSIS MAC 61 in the M-CMTS core 60, the physical gateways 28, and the modems or interfaces at endpoints 42 are configured to support DOCSIS functionality over either cable or non-cable network infrastructures.

For example, the DOCSIS MAC 61 during an adaptation session may configure DSL modem 66 through a DSL physical gateway 30 to operate in the DOCSIS environment. After the adaptation session, different DOCSIS applications 24 and DOCSIS subscriber services 26 described in FIG. 1 can be used with DSL modem 66. Similarly, the DOCSIS MAC 61 can configure Ethernet interfaces 68 via Ethernet physical gateways 40 to support the DOCSIS applications 24 and subscriber services 26. Similar adaptation sessions can be used to configure satellite physical gateway 36 and different satellite modems 70 for supporting DOCSIS.

It should also be noted that the physical distance between the M-CMTS core 60 and the physical gateways 28 can vary depending on the associated network infrastructure 29. For example, it may be advantageous to locate the DSL gateway 30 as close as possible to the DSL modems 66. In this case, the DSL physical gateway 30 may be located a relatively long distance from the M-CMTS core 60. Alternatively, it may not matter how far the satellite physical gateway 28 is from the satellite modems 70. In this situation, for convenience, the satellite gateway 28 may be located relatively close to, or in the same headend, as the M-CMTS core 60.

Figure 3:
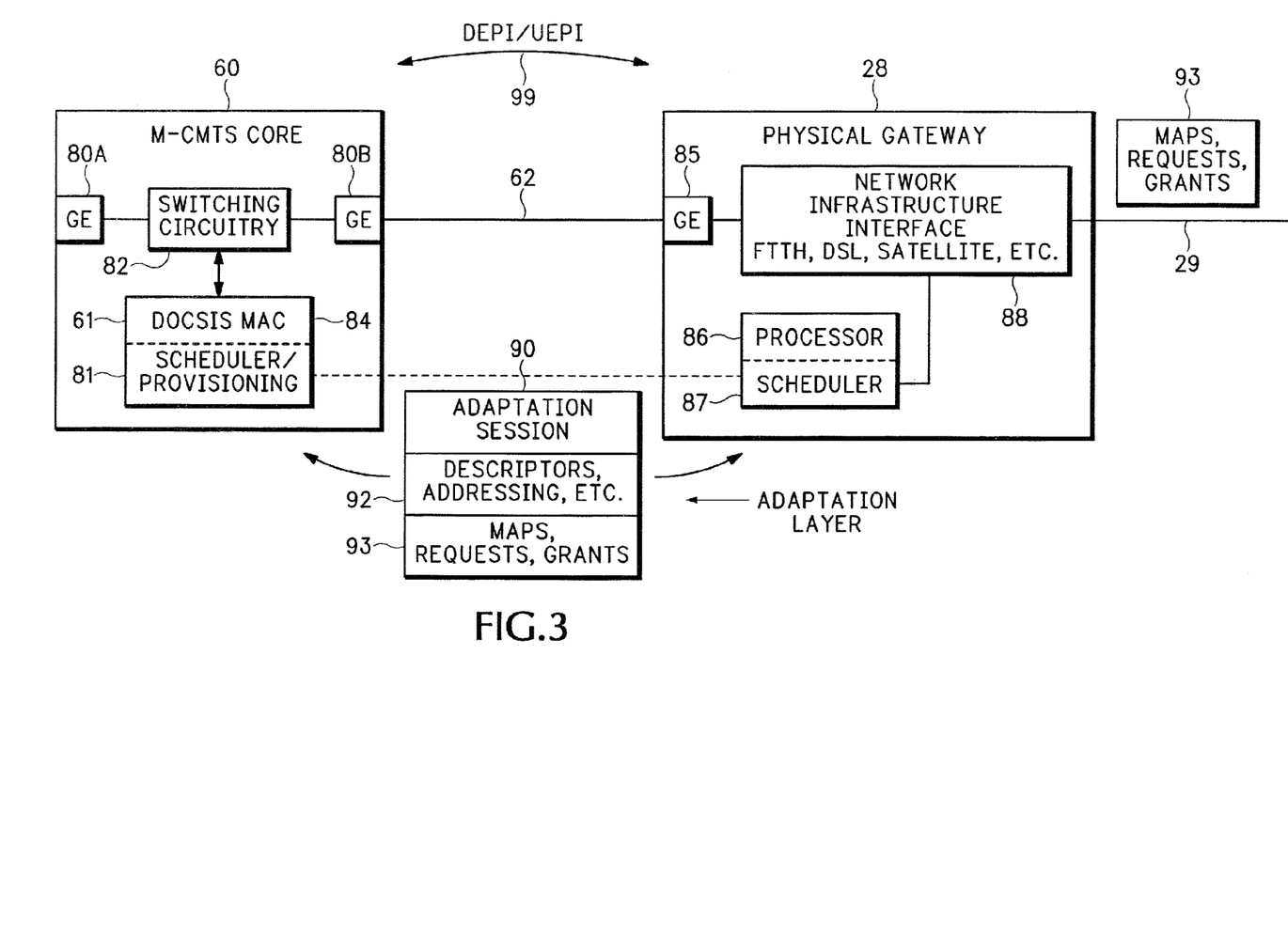
FIGS. 3 and 4 are more detailed diagrams of a M-CMTS core and physical gateways used in the M-CMTS shown in FIG. 2.

FIG. 3 shows in more detail the different components that may exist in the M-CMTS core 60 and in the physical gateway 28. In this embodiment, the M-CMTS core 60 includes a Gigabit Ethernet (GE) interface 80A for receiving and sending packets over the WAN 12 (FIG. 2). Switching circuitry 82 switches packets between the GE interface 80A and other GE interfaces 80B that are connected through the packet switched network 62 to one or more physical gateways 28. A processor or circuitry 84 operates the DOCSIS MAC 61 and communicates with a processor or circuitry 86 in the physical gateway 28. The processor 86 communicates with interface circuitry 88 that interfaces with a particular network infrastructure 29, such as for DSL, Ethernet, satellite, cable, etc., as described above.

In this embodiment, the MAC 61 conducts an adaptation session 90 with the particular physical gateway 28 associated with the endpoint that will receive the packets from WAN 12 (FIG. 1). The adaptation session 90 is controlled by an adaptation layer 102 that is described in more detail below in FIG. 5. During the adaptation session 90, a first adaptation stage may send descriptors 92 to the processor 86 that identify the physical parameters required for transferring information over the "last mile" network infrastructure 29. For example, in the DSL physical gateway 30 (FIG. 2), the descriptors 92 may identify types of DSL modulation and other timing parameters required by interface 88 for establishing a DSL session over network infrastructure 29.

In an alternative embodiment, the MAC 61 may operate at a lower level and simply send a read or write command and an associated address to the processor 86 in messaging 92. The address is associated with a particular memory or register location in the physical gateway 28 that contains the parameters required by interface 88 for communicating over network infrastructure 29. Alternatively, some combination of both descriptors and addressing are exchanged between processor 84 in M-CMTS core 60 and processor 86 in physical gateway 28.

During the adaptation session 90, the MAC 61 may also send and/or receive different maps, requests and/or grants 93 used for scheduling downstream and upstream traffic over the network infrastructure 29. For example, a scheduler/provisioning operation 81 in the MAC 61 exchanges the scheduling information 93 with the endpoints 42 (FIG. 1) that may be used by a particular cable, wireless, satellite, DSL, etc., network infrastructure 29. The scheduling information 93 may also exchange generic DOCSIS scheduling information that will be the same for multiple different network infrastructures 29. In an alternative embodiment, some of all of the scheduling operations may be controlled by a scheduler 87 operated by processor 86 in the physical gateway 28. In this embodiment, the M-CMTS 60 may only conduct layer-3 and higher layer DOCSIS operations. A DOCSIS MAC operated by processor 86 then operates as a scheduler 87 for exchanging messages 93 with the endpoints connected to network infrastructure 29.

Figure 4:
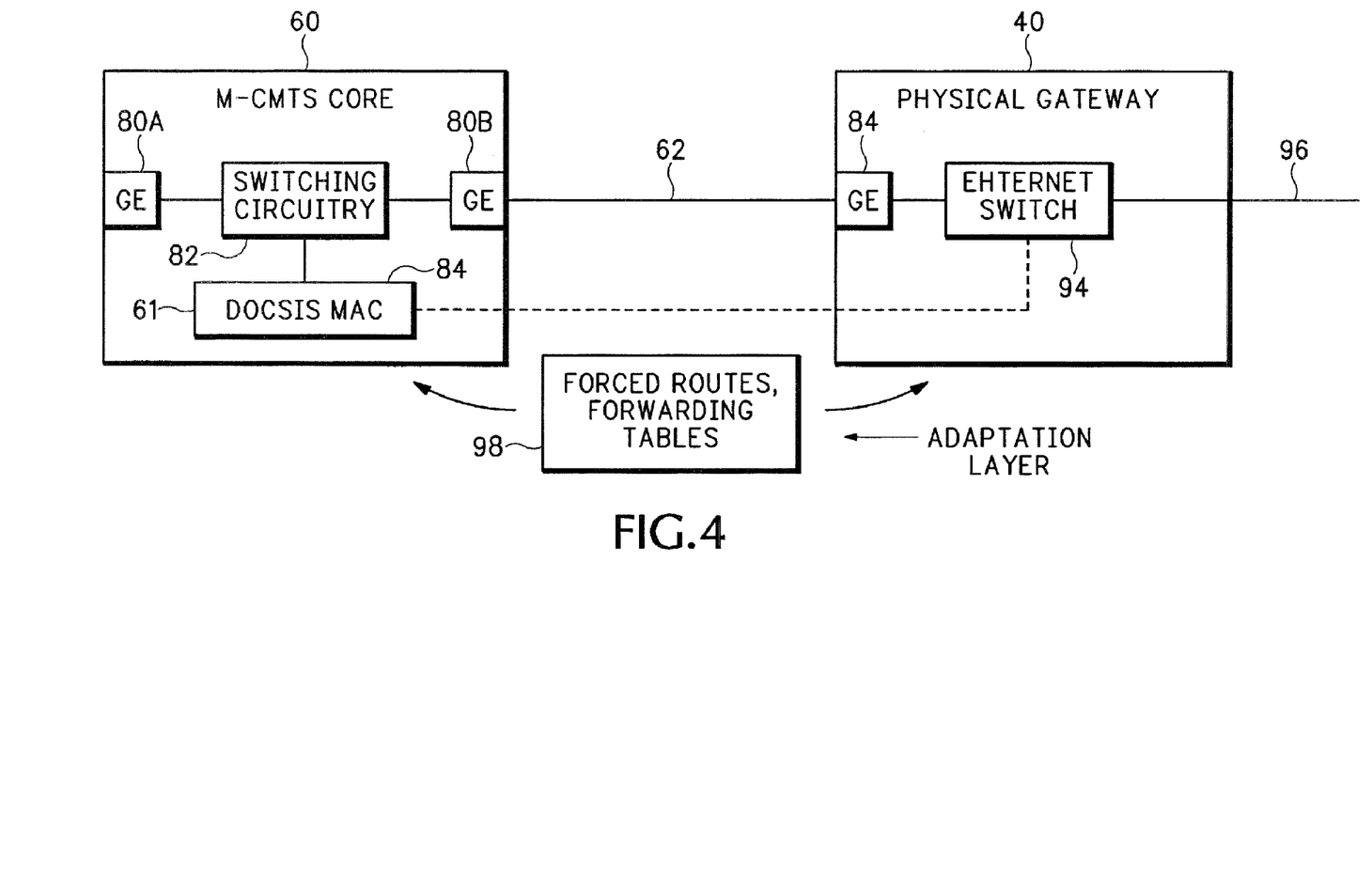

The scheduling information 93 may also include other types of scheduling and/or provisioning messages that need to be exchanged either with the physical gateway 28 or with the endpoints 42. For example, FIG. 4 shows an Ethernet gateway 40 containing an Ethernet switch 94 that transfers packets over an Ethernet network infrastructure 96. The MAC 61 in M-CMTS core 60 can be configured in this example to send forced routes or forwarding tables 98 to the Ethernet switch 94. The routing or switching information 98 can be associated with the particular endpoints or subnets that the Ethernet switch 94 uses to connect to particular provisioned endpoints.

Downstream External Physical Interface (DEPI) and Upstream External Physical Interface (UEPI)

In one example, M-CMTS communication protocols are used for communicating over the packet switched network 62 between the M-CMTS core 60 and the physical gateways 28. One example of a protocol that can be used for downstream communications from the M-CMTS core 60 to the physical gateway 28 is referred to as the Downstream External Physical Interface (DEPI). One example of a protocol that can be used for upstream communications from the physical gateway 28 to the M-CMTS core 60 is referred to as the Upstream External Physical Interface (UEPI).

The adaptation session 90 described in FIG. 3 can be performed in conjunction with or using some modification to the DEPI and UEPI protocols 99 that are currently described for establishing communication sessions between the M-CMTS 60 and an Edge Quadrature Amplitude Modulation (EQAM) physical gateway 32 (FIG. 2). The DEPI and UEPI protocols 99 are described in the same co-pending application Ser. No. 11/134,818, filed May 20, 2005, entitled "TIMING SYSTEM FOR MODULAR CABLE MODEM TERMINATION SYSTEM" and the DEPI protocol further described in co-pending application Ser. No. 11/370,141, filed Mar. 6, 2006, entitled RESOURCE RESERVATION AND ADMISSION CONTROL FOR IP NETWORK, which are both herein incorporated by reference.

As described in the above referenced co-pending applications, the downstream DEPI and upstream UEPI protocols 99 determine how DOCSIS messages and data is transferred between the M-CMTS core 60, the physical gateways 28, and the endpoints 42. As described in the DEPI and UEPI protocols, DOCSIS data may be transferred over the packet network 62 between the M-CMTS 60 and the physical gateway 28 using tunnels, pseudowires, or other virtual connections.

Adaptation Layer

Figure 5:
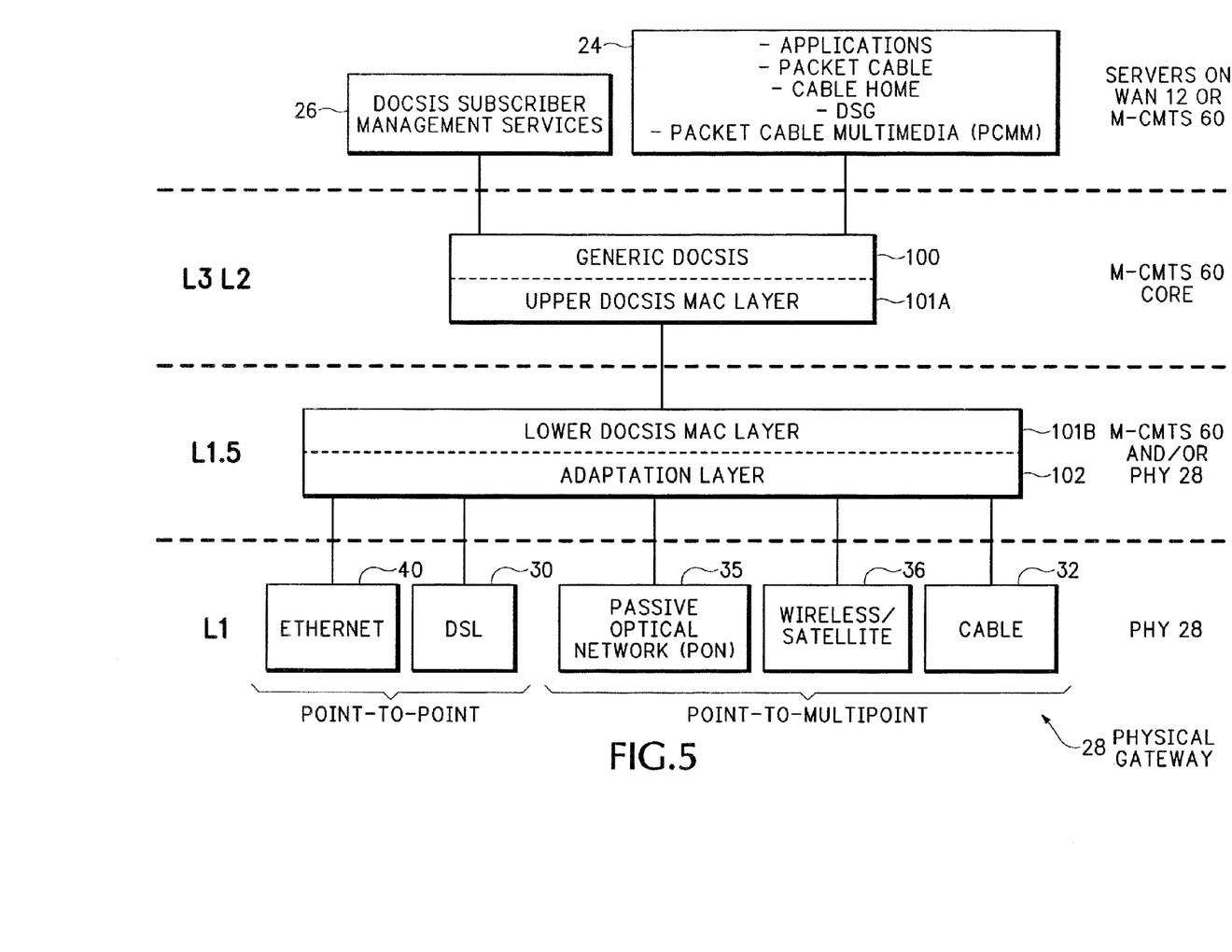
FIG. 5 is a logic diagram showing how different layers of the DOCSIS Open Systems Interconnect (OSI) model may be partitioned in the generic DOCSIS architecture.

FIG. 5 shows in more detail one example of how the generic DOCSIS architecture 10 in FIG. 1 operates. One advantage of the M-CMTS architecture shown in FIG. 2 is that the layer-3 and layer-2 DOCSIS functionality is physically separated from the physical layer-1 functionality. As described above in FIG. 2, the DOCSIS layer-3 and layer-2 operations are performed in the centrally located M-CMTS core 60 and communicate with the physical layer-1 operations performed by the physical gateways 28. This M-CMTS architecture allows many of the same layer-2, layer-3 and other higher DOCSIS Open System Interconnect (OSI) layers operating in or through the M-CMTS core 60 to be used with different layer-1 transport mediums. This promotes commoditization of the specific hardware and software required to connect to a particular network infrastructure 29 (FIG. 2) thus providing more cost efficient scaling and customization for particular service provider network configurations.

FIG. 5 shows just one example of how the same generic DOCSIS operations 100 can be used with cable and non-cable network infrastructures. Generic layer-3 and higher DOCSIS layer-2 operations 100 can be performed centrally in M-CMTS core 60 or in some alternative packet shelf. The generic DOCSIS operations 100 refer to those DOCSIS tasks that can be the same regardless of the particular type of physical network infrastructure 29 used for connecting to the endpoints 42 (FIG. 1)

In this example, the generic DOCSIS layer-3 and layer-2 operations 100 are the same, or substantially similar, for every M-CMTS core 60 regardless of the particular physical infrastructure 29. These generic DOCSIS operations 100 may include DOCSIS layer-3 and some upper DOCSIS MAC layer operations 101A. For example, the upper-DOCSIS MAC layer 101A may be used by the DOCSIS subscriber management services 26 for managing a QoS subscriber environment.

An adaptation layer 102 conducts some or all of the adaptation session 90 described above in FIG. 3. The adaptation layer 102 operates substantially between DOCSIS layer-2 and layer-1 and is used for configuring the different physical gateways 28 and associated network infrastructures to operate over DOCSIS. The adaptation layer 102 provides generally the same interface as a conventional DOCSIS environment but with the required adaptation for the specific physical gateway 28 and associated network infrastructure 29 used for communicating with endpoints 42. For example, in the cable infrastructure, the adaptation layer 102 may include the lower MAC layer operations 101B used for cable modem scheduling.

However, the adaptation layer 102 can be configured to communicate with any physical infrastructure. For example, the adaptation layer 102 can be configured to operate with physical gateways 28 connected to a point-to-point network infrastructure, such as Ethernet gateway 40 or DSL gateway 30. The adaptation layer 102 can also be configured to operate with physical gateways used for any type of point-to-multipoint network infrastructure, such as Passive Optical Network (PON) gateway 35, satellite gateway 36, or HFC gateway 32. Since DOCSIS is conventionally used for point-to-multipoint oversubscription cable networks, the existing DOCSIS environment can be easily adapted to work with other point-to-multipoint physical gateways 35 and 36 for the point-to-point interfaces 30 and 40, much of this existing DOCSIS functionality may simply be disabled or removed in adaptation layer 102.

The adaptation layer 102 can be any combination of software or hardware and can be an addition or modification to the MAC 61 currently described in the Data-Over-Cable System Interface Specifications Radio Frequency Interface Specifications DOCSIS 2.0, released in 2005 which is herein incorporated by reference.

It should also be understood that some or all of the adaptation layer 102 may be performed in the physical gateways 28. For example, the PON physical gateway 35 may not use the scheduling messaging 93 described in FIG. 3. Alternatively, the satellite gateway 36 may require sophisticated signaling with satellite 72 and endpoints 70 (FIG. 2). In this situation, some or all of the MAC adaptation layer scheduling 93 may be performed remotely in the physical gateway as provided by scheduler 87 in FIG. 3. Thus, the actual partitioning of the adaptation layer 102 may vary between the M-CMTS core 60 and the physical gateway 28 depending on the associated network infrastructure 29.

After completion of the adaptation session 90 in FIG. 3 and any other generic DOCSIS operations 100, the different DOCSIS subscriber management services 26 and DOCSIS applications 24 are then free to operate with the endpoints 42 through the M-CMTS core 60 and physical gateway 28. The DOCSIS subscriber management services 26 and the DOCSIS applications 24 can be run in the same manner as currently supported either from servers operated somewhere on the WAN 12 or operated locally at the service provider headend in DOCSIS aggregation system 22 (FIG. 1).

Customer Premise Equipment (CPE)

Figure 6:
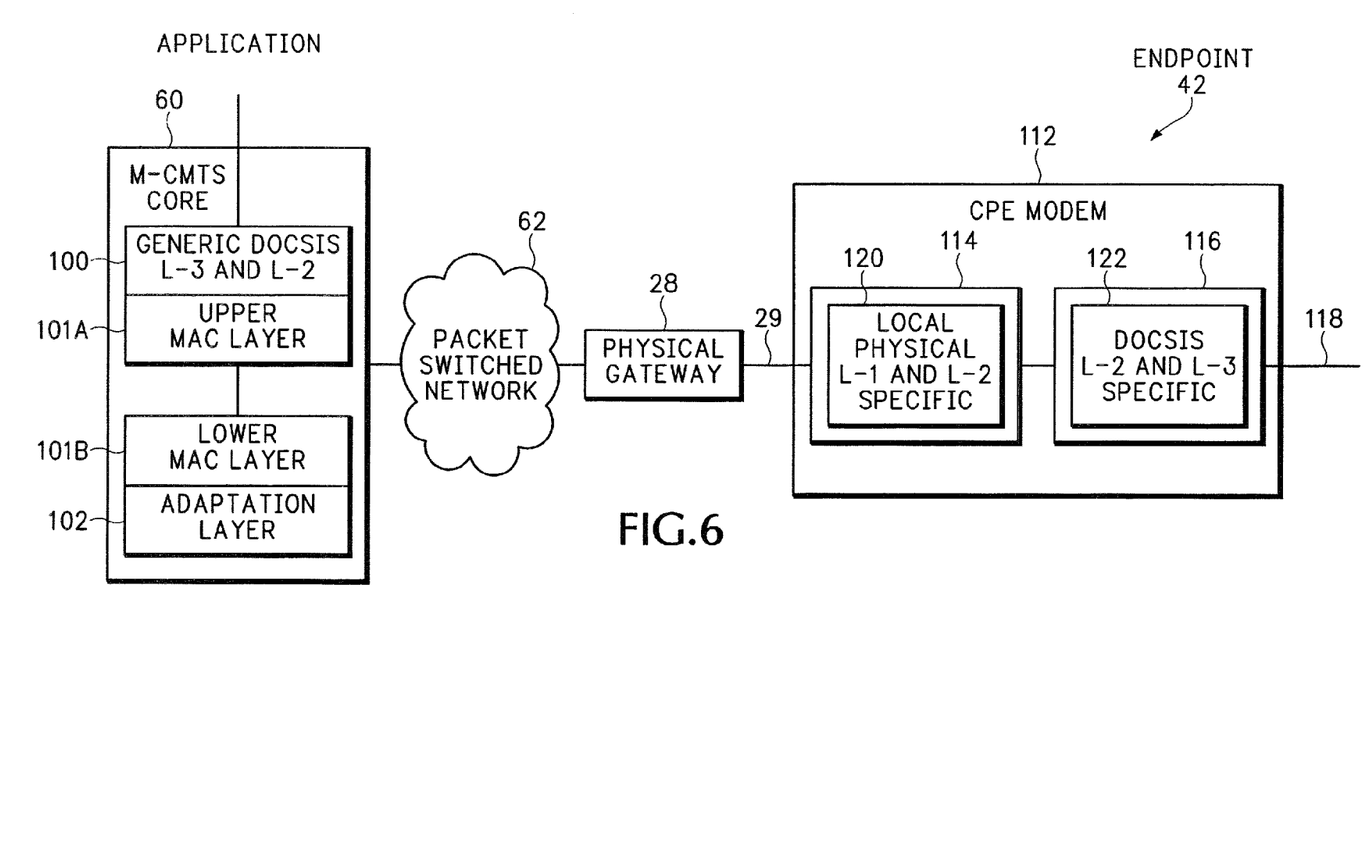
FIG. 6 shows in more detail how both cable and non-cable environments are supported in Customer Premise Equipment (CPE).

FIG. 6 shows how the generic DOCSIS architecture may be supported in the Customer Premise Equipment (CPE) operating at the endpoints 42. The M-CMTS core 60 operates the generic set of layer-3 and layer-2 DOCSIS software 100 including any generic upper MAC layer operations 101A. The M-CMTS core 60 and/or the physical gateway 28 operates the adaptation layer 102 that configures the CPE 112 for a particular network infrastructure 29. Any generic layer-2 and layer-3 DOCSIS operations 100 are then performed by M-CMTS core 60. The DOCSIS applications 24 and subscriber management services 26 (FIG. 1) then utilize the DOCSIS layer-3 and DOCSIS layer-2 functionality to manage and provide services for the CPE 112.

The CPE 112 may include a processor 114 that executes the physical layer and the MAC layer functions specific to the particular network infrastructure 29. For example, in a DSL modem 66 (FIG. 2), the layer-1 and layer-2 operations 120 performed by processor 114 may receive and transmit DSL signals and exchange DSL scheduling messages over a telephone line.

Another processor 116 may be used specifically for handling the DOCSIS upper MAC layer and DOCSIS layer-3 operations 122 that are generic for different physical infrastructures. For example, the processor 116 may handle the DOCSIS communications used for providing higher level IP connectivity. Of course in other embodiments, some or all of the operations 120 and 122 may be executed in the same processor or in other processors or discrete circuitry.

In the example for the DSL modem 66, the processor 114 may be a layer-1/layer-2 DSL Integrated Circuit (IC) chip that provides the functions specific for receiving and/or transmitting DSL signals over a telephone line. The output from the DSL IC is fed into a DOCSIS IC chip 116 that then performs the higher layer IP DOCSIS operations that are independent of the physical infrastructure. The output of DOCSIS IC 116 may interface with an Ethernet connection 118 that connects into a computer, set-top box, television, router, etc.

Figure 7:
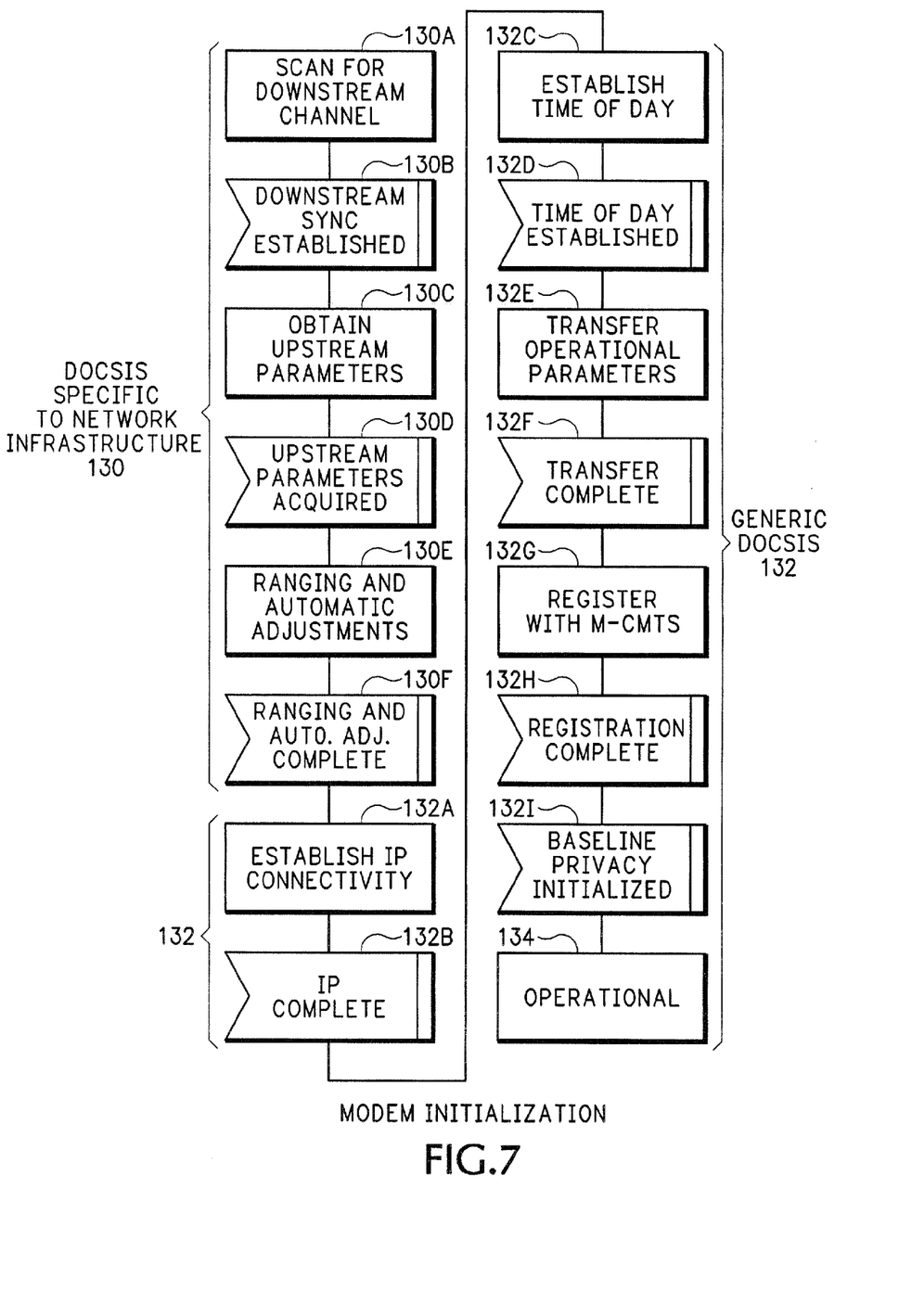
FIG. 7 is a flow diagram showing different cable and non-cable related operations used for configuring a modem.

FIG. 7 shows one example of the different DOCSIS modem operations 130 that may be specific to a particular network infrastructure and other generic DOCSIS modem operations that may be common for different network infrastructures. For example, a cable infrastructure may require a cable modem to scan for a downstream channel in operation 130A and establish downstream synchronization in operation 130B. The cable modem starts obtaining upstream parameters in operation 130C and completes the upstream parameter acquisition in operation 130D. Ranging and automatic adjustments start in operation 130E and are completed in operation 130F. All of these cable specific operations 130 may be executed by the processor 114 in FIG. 6 and communicate with the adaptation layer 102 in the M-CMTS core 60.

The generic DOCSIS layer-2 and layer-3 operations 132 may be performed by processor 116 in FIG. 6 and communicate with the generic DOCSIS operations 100 in the M-CMTS core 60. For example, IP connectivity may be established in operation 132A and completed in operation 132B. A time of day operation starts in operation 132C and is established in operation 132D using a time of day protocol. Operational parameters are transferred in operation 132E and completed in operation 132F. Registration with the M-CMTS 60 for running the DOCSIS protocol is started in operation 132G and completed in operation 132H. Finally, baseline privacy is initialized for encryption in operation 132I. The cable modem 112 is then operational and ready to communicate and exchange DOCSIS data with the M-CMTS 60 in operation 134.

The operations described in FIG. 7 of course could change for different versions of DOCSIS and different embodiments and versions of the network infrastructure. However, FIG. 7 illustrates how generic DOCSIS operations 132 can be used for different non-cable network infrastructures. FIG. 7 also illustrates how these generic DOCSIS operations 132 can be used with the specific lower level configuration and scheduling 130 required for different non-cable network infrastructures.

Figure 8:
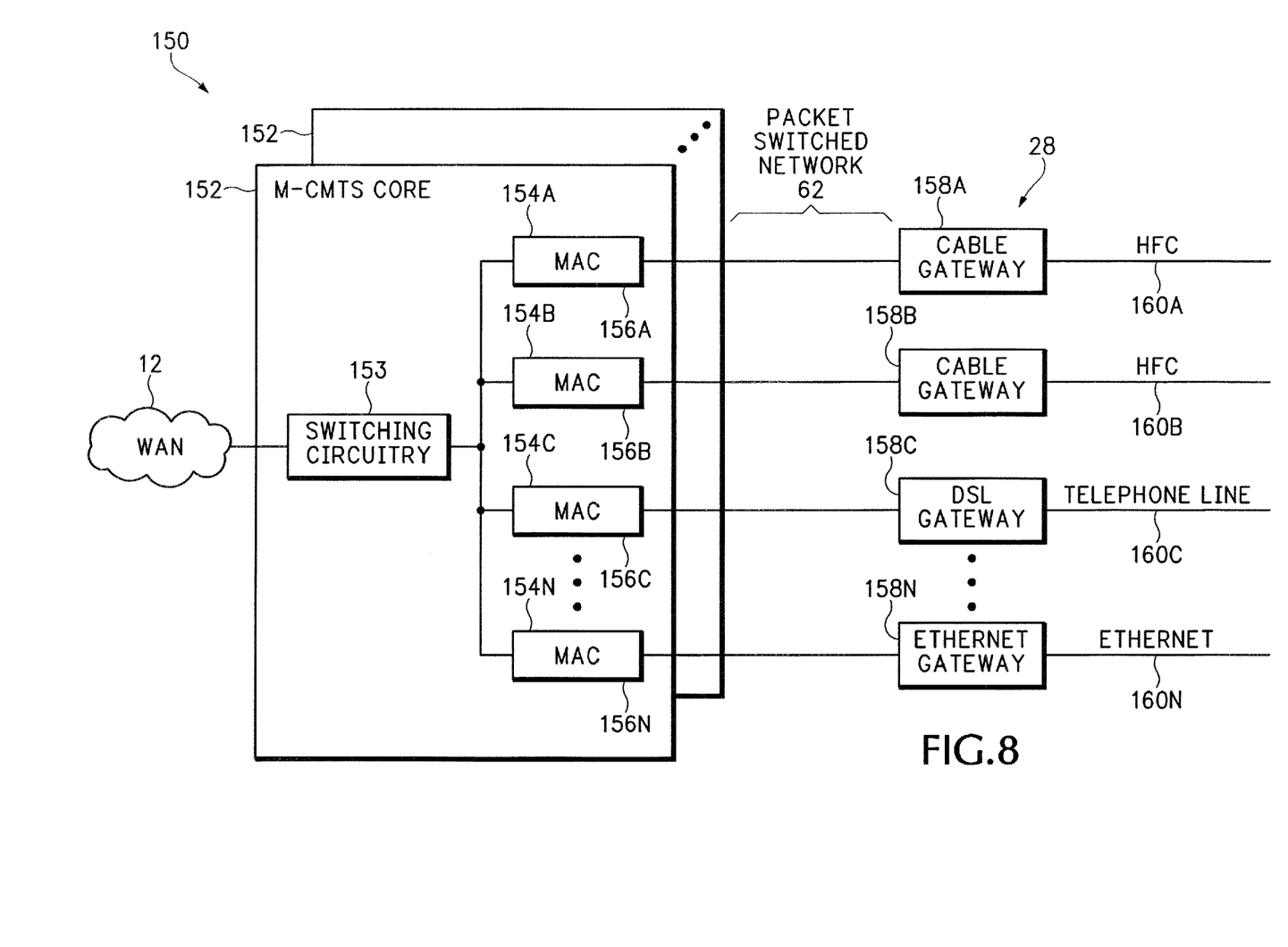
FIG. 8 is a block diagram showing how a M-CMTS core and physical gateways may be configured in another embodiment of the generic DOCSIS architecture.

FIG. 8 shows another embodiment of a generic DOCSIS system 150. Any number of DOCSIS MACs 154 can be located in any number of M-CMTS cores 152 and communicate with any number of physical gateways 28. For example, the same M-CMTS core 152 may include multiple different processors 156A-156N that each operate different DOCSIS MACs 154A-154N, respectively. The different MACs 154 can be configured to communicate with different physical gateways 28 or all of the MACs 154 may be configured to communicate with the same type of physical gateway 26.

For example, a first and second MAC 154A and 154B are configured as described above to communicate over the packet switched network 62 with cable gateways 158A and 158B. A third MAC 154C is configured as described above to communicate over packet switched network 62 with a DSL gateway 158C and a forth MAC 154N is configured to communicate over packet switched network 62 with an Ethernet gateway 158N.

In this embodiment, switching circuitry 153 receives packets over WAN 12 directed to endpoints connected to any one of the different physical gateways 28. The switching circuitry 153 directs the received packets to the MAC 154 associated with the destination endpoint. The MAC 154 receiving the packets conducts the DOCSIS adaptation layer and any generic DOCSIS upper layer operations required for transferring the packets from M-CMTS core 152 over the packet switched network 62 to the associated physical gateway 28. The physical gateway 28 then conducts whatever modulation and other packet processing required for transmitting the packets over the associated network infrastructure 160.

Wideband

The generic DOCSIS architecture described above can also use a wideband protocol described in co-pending patent application Ser. No. 11/138,220, entitled: WIDEBAND PROVISIONING, filed May 25, 2005, and co-pending patent application Ser. No. 10/358,416, entitled: WIDEBAND CABLE SYSTEM, filed Feb. 4, 2003, which are both herein incorporated by reference. Any combination of multiple channels can be bonded together over the particular network infrastructure 29 used for transporting data between the physical gateways 28 and the CPE. For example, a satellite communication system may transport data over timeslots in a Time Division Multiplexing (TDM) signaling scheme. The wideband protocol described above can be used to bond multiple timeslots together, thus creating a wideband channel for sending data to the same CPE.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

SUMMARY

The generic DOCSIS architecture described above allows any device to plug into any type of physical connection and operate the same library of packet cable compliant DOCSIS applications and subscriber services. For example, a television can connect into a DSL line, Ethernet connection, satellite frequency, cable, etc. The particular communication modem used in the television is then automatically configured, provisioned, assigned security, assigned QoS, initialized for parental control, and/or configured with any other subscriber configurable DOCSIS supported features. Similar DOCSIS operations can be provided for PCs, VoIP phones, PDAs, mobile phones, or any other device that needs to communicate with an IP network.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A generic data over cable system, comprising:
a centralized data over cable aggregation system configured to use a data over cable protocol for exchanging information with an endpoint; and
the centralized data over cable aggregation system configured to operate an adaptation layer that configures a non-cable network infrastructure to support data over cable applications and services;
wherein the centralized data over cable aggregation system includes at least one packet shelf and at least one physical layer gateway distributed across a packet switched network and separated from each other by the packet switched network, wherein the at least one packet shelf is located on a core device of the centralized data over cable aggregation system and wherein the at least one packet shelf operates remotely from the at least one physical layer gateway, wherein the at least one packet shelf is configured to generate Data Over Cable Services Interface Specification (DOCSIS) frames for transmitting received data over the packet switched network, and wherein the at least one physical layer gateway is configured to process the DOCSIS framed data for transmission over the non-cable network infrastructure that connects the physical layer gateway to the endpoint; and
wherein the packet switched network contains packet switching accruements configured to forward individually addressed packets such that different ones of the packets can traverse the packet switched network in different amounts of time.

2. The generic data over cable system according to claim 1, wherein the adaptation layer operates partially within layer-2 and partially within layer-1 of the Open Systems Interconnect (OSI) model and is configured according to a type of cable or non-cable network infrastructure connected to the endpoint.

3. The generic data over cable system according to claim 1, wherein the adaptation layer configures a plurality of different physical layer gateways to operate with different associated cable and non-cable network infrastructures.

4. The generic data over cable system according to claim 3, wherein either the centralized data over cable aggregation system or one of the physical layer gateways are configured to send scheduling messages to the endpoint, the scheduling messages corresponding with the type of network infrastructure coupling the endpoint to the centralized data over cable aggregation system.

5. The generic data over cable system according to claim 1, wherein the centralized data over cable aggregation system and the endpoint each include a DOCSIS Media Access Controller (MAC) configured to exchange DOCSIS messaging over the non-cable network infrastructure.

6. The generic data over cable system according to claim 1, wherein the adaptation layer configures both cable and non-cable network infrastructures to support DOCSIS applications and DOCSIS subscriber management services.

7. The generic data over cable system of claim 1, wherein the packet switched network is an Internet Protocol (IP) network.

8. A physical layer gateway, comprising:
a packet switched network interface for receiving configuration information from a remote packet shelf over a packet switched network, wherein the remote packet shelf is located on a core device of a cable modem termination system, and wherein the physical layer gateway is separated from the core device by the packet switched network;

a non-cable network interface for communicating with an endpoint over a non-cable network infrastructure that connects the physical layer gateway to the endpoint;

circuitry configured to receive Data Over Cable Services Interface Specification (DOCSIS) framed communications from the remote packet shelf over the packet switched network, the circuitry configured to process the DOCSIS framed data for transmission over the non-cable network infrastructure; and the circuitry configured to use the configuration information from the remote packet shelf to configure the non-cable network infrastructure to support DOCSIS messaging.

9. The physical layer gateway according to claim 8, wherein the packet switched network interface communicates with the remote packet shelf over an Internet Protocol (IP) network.

10. The physical layer gateway according to claim 8, wherein the non-cable network interface communicates with at least one of the following non-cable network infrastructures:
Digital Subscriber Line;
Satellite;
Ethernet;
Wireless; and
Optical Fiber.

11. The physical layer gateway according to claim 8, wherein the circuitry is configured to receive non-DOCSIS messaging from the remote packet shelf for configuring both the non-cable network interface and the endpoint to operate over the non-cable network infrastructure, the circuitry configured to receive DOCSIS messaging for configuring the endpoint for operating with a DOCSIS protocol.

12. Customer premise equipment, comprising:
a physical interface configured to communicate over a non-cable network infrastructure; and
a processor configured to conduct data over cable operations with a central data over cable system over the non-cable network infrastructure;
wherein the physical interface conducts layer-1 and layer-2 operations associated with the particular non-cable network infrastructure and the processor conducts generic layer-2 and layer-3 data over cable operations with the central data over cable system; and
wherein the physical interface is coupled though the non-cable network infrastructure to a physical layer gateway, and the physical layer gateway is coupled through a packet switched network to a packet shelf of the central data over cable system, wherein the packet shelf is located on a core device of the central data over cable system, and wherein the physical layer gateway is separated from the core device by the packet switched network.

13. The customer premise equipment according to claim 12, wherein the physical interface includes at least one of the following:
a Digital Subscriber Line (DSL) modem;
a satellite modem;
an optical fiber interface;
a wireless modem; or
an Ethernet interface.

14. The customer premise equipment according to claim 12, wherein lower Media Access Control (MAC) level operations are executed in the physical interface and higher MAC level operations are executed in the processor.

15. The customer premise equipment of claim 12, wherein the physical layer gateway is coupled through an Internet Protocol (IP) network to the central data over cable system.

16. A method for operating a data over cable environment over a non-cable network infrastructure, comprising:
configuring a physical interface for communicating over an associated non-cable network infrastructure;
configuring data over cable functionality into endpoints coupled to the non-cable network infrastructure;
operating data over cable applications and/or data over cable subscriber management services with the endpoints over the non-cable network infrastructure;
operating a Data Over Cable Services Interface Specification (DOCSIS) Media Access Controller (MAC) in a central Modular Cable Modem Termination System (M-CMTS) core;
establishing a communication session between the M-CMTS core and a remote physical layer gateway over a packet switched network, wherein the M-CMTS core and the remote physical layer gateway are separated by the packet switched network;
configuring the remote physical layer gateway and the endpoints for operating in a particular non-cable network infrastructure during the communication session; and
using the DOCSIS MAC in the M-CMTS core to exchange DOCSIS messaging with the endpoints over the remote physical layer gateway and the non-cable network infrastructure.

17. The method according to claim 16 including:
conducting an adaptation session with both the physical interface and the endpoints that in a first stage exchanges messages particular to the non-cable network infrastructure; and
exchanging DOCSIS messages with both the physical interface and the endpoints during a second stage of the adaptation session that are the same regardless of the type of cable or non-cable network infrastructure.

18. The method of claim 16, wherein the packet switched network is an Internet Protocol (IP) network.

* * * * *

UNITED STATES PATENT AND TRADEMARK OFFICE
CERTIFICATE OF CORRECTION

PATENT NO.       : 7,630,361 B2                              Page 1 of 1
APPLICATION NO.  : 11/385129
DATED            : December 8, 2009
INVENTOR(S)      : Chapman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 870 days.

Signed and Sealed this

Twenty-first Day of December, 2010

David J. Kappos
*Director of the United States Patent and Trademark Office*